United States Patent [19]

Saito et al.

[11] Patent Number: 4,749,671
[45] Date of Patent: Jun. 7, 1988

[54] EXHAUST GAS CLEANING CATALYST AND PROCESS FOR PRODUCTION THEREOF

[75] Inventors: Koichi Saito; Kenji Ueda; Yasuo Ikeda, all of Himeji, Japan

[73] Assignee: Nippon Shokubai Kagaku Kogyo Co., Ltd., Osaka, Japan

[21] Appl. No.: 880,827

[22] Filed: Jul. 1, 1986

[30] Foreign Application Priority Data

Jul. 2, 1985 [JP] Japan ............... 60-144007
Nov. 1, 1985 [JP] Japan ............... 60-244193
Nov. 28, 1985 [JP] Japan ............... 60-266145

[51] Int. Cl.$^4$ ............... B01J 8/02
[52] U.S. Cl. ............... 502/64; 502/65; 502/66; 502/177; 502/178; 502/200; 502/210; 502/213; 502/232; 502/240; 502/241; 502/242; 502/243; 502/244; 502/245; 502/246; 502/247; 502/251; 502/252; 502/254; 502/261; 502/262; 502/263; 502/303; 502/304; 502/313; 502/324; 502/325; 502/326; 502/327; 502/328; 502/329; 502/330; 502/331; 502/334; 502/339; 502/344; 502/349; 502/350; 502/351; 502/527; 423/213.2; 423/213.5

[58] Field of Search ............... 502/64–66, 502/177–178, 200, 210, 213, 232, 240–247, 251–252, 254, 261–263, 303–304, 313, 324–331, 334, 339, 344, 349–351, 527

[56] References Cited

U.S. PATENT DOCUMENTS

| | | | |
|---|---|---|---|
| 3,891,575 | 6/1975 | Brautigam et al. | 502/262 X |
| 3,956,185 | 5/1976 | Yagi et al. | 502/241 X |
| 3,972,834 | 8/1976 | Washbourne | 502/263 X |
| 4,189,404 | 2/1980 | Keith et al. | 502/304 X |
| 4,247,422 | 1/1981 | Davies | 502/527 X |
| 4,303,552 | 12/1981 | Ernest et al. | 502/313 X |
| 4,404,007 | 9/1983 | Tukao et al. | 55/523 |
| 4,426,320 | 1/1984 | Ernest et al. | 502/349 X |
| 4,451,441 | 5/1984 | Ernest et al. | 502/527 X |

FOREIGN PATENT DOCUMENTS

| | | |
|---|---|---|
| 92023 | 10/1983 | European Pat. Off. |
| 2304351 | 8/1974 | Fed. Rep. of Germany |
| 2024646 | 1/1980 | United Kingdom |
| 2091584 | 8/1982 | United Kingdom |

*Primary Examiner*—Patrick P. Garvin
*Attorney, Agent, or Firm*—Sherman and Shalloway

[57] ABSTRACT

An exhaust gas cleaning catalyst composed of a refractory three-dimensional structure and a catalytically active substance supported thereon. That surface or part of the catalyst which makes contact with an exhaust gas is formed of numerous irregularly arranged protrusions composed of a refractory inorganic powder having a particle diameter of 5 to 300 micrometers or a mixture of it with refractory inorganic fibers and the catalytically active substance supported on the protrusions. The catalyst can be produced, for example, by preparing an aqueous slurry from the refractory inorganic powder having a particle diameter of 5 to 300 micrometers or a mixture of it with the refractory inorganic fibers and a suitable dispersant, forming numerous irregularly arranged protrusions on that surface or part of a refractory three-dimensional structure which makes contact with an exhaust gas by using the resulting slurry, drying the structure optionally followed by calcination, depositing the catalytically active substance, and drying and calcining the resulting structure.

15 Claims, No Drawings

EXHAUST GAS CLEANING CATALYST AND PROCESS FOR PRODUCTION THEREOF

This invention relates to a catalyst for cleaning diesel engine exhaust gases or industrial exhaust gases containing combustible fine carbonaceous particles.

In recent years, fine carbonaceous particles in diesel engine exhaust gases (consisting mainly of solid fine carbon particles, fine particles of sulfur-containing substances such as sulfate salts, and liquid or solid high-molecular-weight fine hydrocarbon particles) have tended to give rise to an environmental hygienic problem. Most of these particles have a particle diameter of less than 1 micrometer. They are liable to float in the air and be inhaled by man by respiration. Hence, rigorous restrictions on discharging of such fine carbonaceous particles from diesel engines or the like have been under consideration.

There are roughly the following two methods for removal of these fine carbonaceous particles. One is to filter an exhaust gas with a heat-resistant gas filter (for example, a ceramic foam, a wire mesh, a metal foam, or a wall-flow type ceramic honeycomb) and capture fine carbonaceous particles, and to regenerate the filter by burning the accumulated fine carbonaceous particles by a burner or the like when the pressure drop rises. The other method is to deposit a catalytic substance on a carrier having such a heat-resistant gas filter structure whereby both a filtration operation and a burning treatment are performed by using such a filter structure and the frequency of regeneration by burning is thus decreased or the burning activity of the catalyst is increased to such a degree as to require no regeneration.

According to the former method, the rise of the pressure drop occurs early as the effect of removing the fine carbonaceous particles is increased. The frequency of regenerating the filter also increases. Hence, such a method is troublesome and is very disadvantageous economically. In contrast, the latter method would be much better if it employs a catalytic substance which can effectively maintain its catalytic activity under the exhaust gas discharging conditions (gas composition and temperature) in a diesel engine.

The temperature of a diesel engine exhaust gas during driving on an urban road is much lower than than from a gasoline engine, and even at an exit of a manifold, the temperature does not reach 450° C. It has been desired therefore to develop an exhaust gas cleaning catalyst which can well permit ignition and burning of accumulated fine carbonaceous particles at a temperature obtained under ordinary operating conditions of engine, for example at temperatures below 300° C. In fact, no such catalyst has ever been obtained.

It has previously been reported that with regard to catalysts for burning fine carbonaceous particles, a 7.5% rhodium/platinum alloy, a 50:50 mixture of Pt and Pd, and palladium or an alloy of palladium and not more than 75% by weight of platinum supported on tantalum oxide or cerium oxide are effective for SOF (soluble organic fraction) (GB No. 2,024,646).

Elsewhere, a composition comprising at least one material selected from noble metals, chromium, and catalytically active compounds thereof deposited on a porous refractory inorganic oxide and at least one bulk material selected from elements of the first transition series, silver, hafnium and catalytically active compounds thereof (U.S. Pat. No. 4,303,552), and a composition comprising copper or a copper compound in combination with molybdenum or vanadium or further with platinum, rhodium, etc. (EP No. 92,023) have also been proposed.

With these prior art catalysts, it has been found difficult to fully secure the low-temperature ignitability of fine carbonaceous particles contained in diesel engine exhaust gases.

Generally, in catalysts heretofore proposed, the catalytically active substances are deposited as a layer of fine catalytically active particles on that part of a three-dimensional structure which makes contact with an exhaust gas, or on wall surfaces inside internal pores of aggregate. Hence, the efficiency of contact with captured fine carbonaceous particles is poor, and sufficient burning ability cannot be obtained from the catalytically active substances.

It is an object of this invention to provide a catalyst which can burn fine carbonaceous particles in an exhaust gas from an automobile engine, particularly a diesel engine, at lower temperatures, and a process for producing such a catalyst.

It has now been found in accordance with this invention that in order to secure the low-temperature ignitability of fine carbonaceous particles from the catalyst, the catalytically active substance should be deposited as protrusions so as to increase the efficiency of contact with the fine carbonaceous particles accumulated in layer at that surface or part of the three-dimensional structure which makes contact with an exhaust gas.

Thus, according to this invention, there is provided an exhaust gas cleaning catalyst composed of a refractory three-dimensional structure and a catalytically active substance supported thereon, wherein that surface or part of the catalyst which makes contact with an exhaust gas is formed of numerous irregularly arranged protrusions composed of a refractory inorganic powder having a particle diameter of 5 to 300 micrometers or a mixture of it with refractory inorganic fibers and the catalytically active substance supported on the protrusions.

The catalyst of this invention can be produced by a process which comprises depositing a catalytically active substance on a refractory inorganic powder having a particle diameter of 5 to 300 micrometers or a mixture of it with refractory inorganic fibers, preparing an aqueous slurry from the resulting mixture and at least one dispersant selected from the group consisting of alumina sol, titania sol, zirconia sol, silica sol, soluble boehmite and soluble organic polymer compounds, forming numerous irregularly arranged protrusions on that surface or part of a refractory three-dimensional structure which makes contact with an exhaust gas by using the resulting aqueous slurry, and drying and calcining the resulting structure.

Alternatively, the catalyst of this invention is produced by a process which comprises preparing an aqueous slurry from a refractory inorganic powder having a particle diameter of 5 to 300 micrometers or a mixture of it with refractory inorganic fibers and at least one dispersant selected from the group consisting of alumina sol, titania sol, zirconia sol, silica sol, soluble boehmite and soluble organic polymer compounds, forming numerous irregularly arranged protrusions on that surface or part of a refractory three-dimensional structure which makes contact with an exhaust gas by using the resulting aqueous slurry, drying the structure, optionally followed by calcination, depositing a catalytically active substance on the structure, and drying and calcining the resulting mixture.

Although the invention is in no way restricted by theory, the principle of the present invention can be explained as follows:

Fine carbonaceous particles are accumulated in layer on that part of the three-dimensional structure which makes contact with an exhaust gas. Let us assume that the three-dimensional structure is a wall-flow honeycomb monolithic body (a ceramic monolithic wall-flow honeycomb composed of a number of gas flow channels in which the flow channels are composed of channels having an open inlet portion and a closed outlet portion and channels having a closed inlet portion and an open outlet portion alternately and adjacently arranged and the flow channel walls adjacent to each other are composed of a porous partition wall having a gas filter function). When a gas passes through the pores in the partition walls, fine carbonaceous particles form a bridge on the side wall surfaces at the inlet portion of pores and are accumulated there in layer in spite of the fact that the average diameter of the pores is much larger than that of the fine carbonaceous particles. If the platinum-group element-containing catalyst is deposited in layer on the surface of the partition wall or on the aggregate inside pores of the partition wall without forming protrusions, the efficiency of contact of the catalytically active substance with the accumulated carbonaceous particles is poor, and no desirable catalytic action is observed. In contrast, according to this invention, the contact efficiency is increased and the efficiency of burning the carbonaceous particles is very much increased since the catalytically active substance is deposited as protrusions on the gas contacting surface or part of the three-dimensional structure.

The three-dimensional structure used in this invention may conveniently be a ceramic foam, an openflow ceramic honeycomb, a wall flow honeycomb monolithic body, a metal honeycomb, a metal foam, etc.

The catalytically active substance used in this invention is at least one substance selected from the group consisting of platinum, rhodium, palladium, vanadium, iron, cobalt, nickel, molybdenum, tungsten, niobium, phosphorus, lead, zinc, tin, copper, chromium, manganese, cerium, lanthanum and silver. Of these, platinum, rhodium and palladium are especially preferred. It is also possible to use a combination of at least one catalytically active substance selected from the group consisting of platinum, rhodium and palladium and at least one substance selected from the group consisting of vanadium, iron, cobalt, nickel, molybdenum, tungsten, niobium, phosphorus, lead, zinc, tin, copper, chromium, manganese, cerium, lanthanum, silver, barium, magnesium, calcium, strontium, potassium, sodium, cesium and rubidium.

Suitable refractory inorganic powders for use in this invention include, for example, active alumina, silica, titania, zirconia, silica-alumina, alumina-zirconia, alumina-titania, silica-titania, silica-zirconia, titania-zirconia and zeolite. They must have a particle diameter in the range of 5 to 300 micrometers.

Examples of suitable refractory inorganic fibers used in this invention are glass, alumina, silica, silicon nitride ($Si_3N_4$), silicon carbide (SiC), potassium titanate, rock wool, zirconia, titanium carbide, iron, nickel, tungsten and calcium phosphate in the form of fibers or whiskers.

The diameter and length of the inorganic fibrous substance have strong correlation to the average particle diameter of the refractory inorganic powder used. Its diameter is preferably 1/300 to 1/5 times its average particle diameter. Inorganic fibrous substances having diameters outside this range are undesirable because fibers having too small a diameter will simply get entangled with the particles, and those having too large a diameter make it difficult to deposit the catalytically active substance as protrusions.

The length of the fibers is also correlated to the average particle diameter, and is preferably 1/10 to 20 times the average particle diameter. Those having too small a length just fill in the interstices of the particles, and those having too large a length have poor dispersibility with the particles and will form masses consisting solely of the fibers.

The refractory inorganic powder, as stated above, should have a particle diameter of 5 to 300 micrometers. If the particle diameter is less than 5 micrometers, the resulting protrusions are small, and there is hardly any effect of increasing the efficiency of contact with the fine carbonaceous particles. On the other hand, if the particle diameter is larger than 300 micrometers, it is difficult to form protrusions, and the area of contact of the resulting protrusions decreases. Hence, the ability of the catalytically active substance to burn the fine carbonaceous particles cannot be increased too much.

The amount of the refractory inorganic fibers used, as the ratio by weight to the amount of the refractory inorganic powder, is from 1:1 to 1:0.05, particularly from 1:0.7 to 1:0.07. If the refractory inorganic fibers is used in a larger ratio, the formation of protrusions by the particles is hampered. On the other hand, if it is used in a smaller ratio, no effect of adding the refractory inorganic fibers is observed.

The production of the catalyst of this invention is not particularly restricted, and for example, the following processes may be cited as preferred ones.

Active alumina pellets are impregnated with an aqueous solution of a water-soluble salt of a catalytically active substance, dried and calcined. Thereafter, the calcined product is pulverized by a hammer mill (for example, PULVERIZER produced by Hosokawa Micron Co., Ltd.) and classified by a classifier (for example, MICRON SEPARATOR Model MS-O produced by Hosokawa Micron Co., Ltd.) to give a powder composed of the refractory inorganic powder having a particle size distribution between 5 micrometers and 300 micrometers and the catalytically active substance deposited thereon. Thereafter, the resulting powder, either alone or in combination with the refractory inorganic fibers, is put into an aqueous solution containing 1 to 20% by weight, as alumina ($Al_2O_3$), of soluble boehmite (for example DISPURAL made by Condea Co., Ltd.), and the mixture is stirred. By the thickening effect of the boehmite dispersant, the powdery active substance does not settle even on stopping the stirring, and a stable slurry can be obtained. The slurry is impregnated into a three-dimensional structure, and the excess of the slurry is removed. As a result, catalyst layers in the form of protrusions having a large height can be formed on the surfaces of the inner walls of the structure or on the surface of the structure. The impregnated three-dimensional structure is then dried, and calcined at 200° to 800° C., particularly 300° to 700° C.

The dispersant used may also be sols such as alumina, titania, zirconia and silica sols, and soluble organic polymer compounds besides soluble boehmite. Examples of the soluble organic polymer compounds are poly(- sodium acrylate), poly(ammonium acrylate), a sodium or ammonium salt of acrylic acid/maleic acid copolymer, polyethylene oxide, polyvinyl alcohol, carboxymethyl cellulose, methyl cellulose, hydroxyethyl cellulose, starch, gum arabic, guar gum and glue. To make the catalyst coat layer more porous, it is possible to add a soluble organic polymer compound such as polyethylene glycol to the slurry, and remove it by calcination.

Another preferred process for producing the catalyst of this invention comprises first depositing the refractory inorganic powder (and optionally the refractory inorganic fibers) on the three-dimensional structure, further depositing a catalytically active substance on the three-dimensional structure, and drying and calcining the resulting structure.

In the catalyst of this invention, the total amount of substances deposited including the catalytically active substance is not particularly restricted. It is 10 to 200 g, preferably 20 to 150 g, per liter of the three-dimensional structure.

The amount of the refractory inorganic powder is in the range of 5 to 150 g, preferably 10 to 120 g, per liter of the three-dimensional structure. The amount of the inorganic fibrous substance optionally used, as the weight ratio to the refractory inorganic powder, is advantageously from 1:1 to 1:0.05, preferably from 1:0.7 to 1:0.07.

The amount of a catalytically active substance deposited is 0.01 to 70 g, preferably 0.05 to 50 g, as an oxide or metal, per liter of the three-dimensional structure.

The burning reaction of the fine carbonaceous particle is a solid-solid reaction and the efficiency of contact between the catalytically active substance and the fine carbonaceous particles is a very important factor.

The present invention is characterized by the fact that the efficiency of burning is markedly increased by depositing the catalytically active substance to protrusions of a suitable size composed of the refractory inorganic powder (and optionally the refractory inorganic fibers).

When refractory inorganic fibrous material is used, bridging of the fine carbonaceous particles is prevented, and the efficiency of contact with the catalytically active substance is further increased. Consequently, the fine carbonaceous particles can be burnt at lower temperatures than in the absence of the inorganic fibrous substance.

The following Examples and Comparative Examples illustrate the present invention more specifically.

EXAMPLE 1

One kilogram of commercial active alumina pellets (diameter 3 to 5 mm, surface area 150 m$^2$/g) were impregnated with 1 liter of an aqueous solution of 290 g of ammonium metavanadate and 435 g of oxalic acid, withdrawn, dried at 150° C. for 3 hours, and calcined in air at 500° C. for 2 hours. The pellets were pulverized by a hammer mill, and classified by a classifying device so that the proportion of particles having a particle size of 5 micrometers to 30 micrometers became not more than 20%. Coarse particles having a particle diameter of more than 300 micrometers were removed by using a sieve. The resulting granular active substance had an average particle diameter of 75 micrometers and contained 12.5% of particles with a size of 5 to 30 micrometers, 13.5% of paricles with 30 to 45 micrometers, 22% of particles with a size of 45 to 74 micrometers, 27% of particles with a size of 74 to 105 micrometers, 12% of particles with a size of 105 to 149 micrometers and 13% of particles with a size of 149 to 300 micrometers.

In an aqueous solution of 15 g (11.25 g calculated as Al$_2$O$_3$) of soluble boehmite was dispersed 150 g of the classified powdery catalyst obtained above to form 520 ml of a stable slurry. The slurry had a viscosity of 25 cps at room temperature.

A commercial wall-flow type honeycomb monolithic body (material: cordierite; 5.66 inches in diameter, 6.0 inches in length, 100 cells/inch$^2$, wall thickness 17 mils) was used as a carrier. The partition walls of the carrier had an average pore diameter of 30 micrometers.

The above slurry (520 ml) was poured into the carrier from the side surface of its gas inlet portions, and the excess of the slurry was removed from the opposite side by means of an air blower. The carrier was dried at 150° C. for 3 hours, and calcined in air at 500° C. for 2 hours to obtain a finished catalyst. The amounts of Al$_2$O$_3$ and V$_2$O$_5$ deposited in the finished catalyst were 40 g/liter-carrier, and 9 g/liter-carrier, respectively. The catalytic substance was deposited as layers of coarse particles on the wall surface of the carrier without closing the pores of the carrier.

EXAMPLE 2

One kilogram of commercial titania pellets (diameter 3 to 5 mm, surface area 30 m$^2$/g) was immersed with 450 ml of an aqueous solution of 276 g of ammonium molybdate, dried at 150° C. for 3 hours, and calcined in air at 500° C. for 2 hours.

The pellets were pulverized and classified (average particle diameter 65 micrometrs) as in Example 1. A catalyst was prepared in the same way as in Example 1 using 150 g of the resulting classified powdery catalytically active substance. The slurry used had a viscosity of 28 cps.

The finished catalyst contained 40 g/liter-carrier of TiO$_2$ and 9 g/liter-carrier of MoO$_3$ deposited thereon.

EXAMPLE 3

A classified powdery catalyst was obtained by depositing copper oxide (CuO) using copper nitrate [Cu(NO$_3$)$_2$.6H$_2$O on titania-silica pellets (TiO$_2$/SiO$_2$ mole ratio=4/1) prepared in advance.

The powdery catalyst was deposited on a three-dimensional structure as in Example 1 to form a finished catalyst which contained 40 g/liter-carrier of TiO$_2$-SiO$_2$ and 9 g/liter-carrier of CuO deposited thereon.

EXAMPLE 4

As in Example 1, each of the catalytically active substances shown in Table 1 was deposited on pellets of a heat-resistant inorganic substance and a classified powdery catalyst was obtained. The powdery catalyst was deposited on the same three-dimensional structure in the same way as in Example 1 to give a finished catalyst.

TABLE 1

| Catalyst designation | Composition (g/l-carrier) | Refractory inorganic substance (g/l-carrier) |
| --- | --- | --- |
| 4-1 | PbO$_2$(9) | Al$_2$O$_3$(40) |
| 4-2 | WO$_3$(9) | Al$_2$O$_3$(40) |
| 4-3 | CoO(9) | Al$_2$O$_3$(40) |
| 4-4 | MnO$_2$(5)—CuO(4) | ZrO$_2$(40) |
| 4-5 | Ag$_2$O(9) | SiO$_2$—Al$_2$O$_3$(4/1,40)* |
| 4-6 | CuO(4)—Cr$_2$O$_3$(4)—K$_2$O(1) | Al$_2$O$_3$(40) |
| 4-7 | Nb$_2$O$_5$(8)—BaO(1) | Al$_2$O$_3$—ZrO$_2$(3/1,40)* |

TABLE 1-continued

| Catalyst designation | Composition (g/l-carrier) | Refractory inorganic substance (g/l-carrier) |
| --- | --- | --- |
| 4-8 | NiO(7)—CeO$_2$(2) | Al$_2$O$_3$(40) |

Note
*shows the composition ratio (mole ratio) of the heat-resistant inorganic substance. In the preparation of the catalysts shown in Table 1, ammonium paratungstate was used as a source of WO$_3$; niobium chloride, as a source of Nb$_2$O$_5$, and nitrates, as sources of the other catalytically active substances.

EXAMPLE 5

One hundred and fifty grams of MoO$_3$-deposited titania pulverized and classified as in Example 2 was dispersed in an aqueous solution of poly(ammonium crylate) (AQUALIC-NL, a tradename for a product of Nippon Shokubai Kagaku Kogyo Co., Ltd.) in a concentration of 1% by weight as solids to give 520 ml of a stable slurry. A catalyst was prepared as in Example 1 using the slurry. The finished catalyst contained 40 g/liter-carrier of TiO$_2$ and 9 g/liter-carrier of MoO$_3$ deposited thereon.

COMPARATIVE EXAMPLE 1

V$_2$O$_5$-deposited alumina pellets prepared in the same way as in Example 1 were pulverized by a hammer mill and then wet-pulverized by an ordinary wet mill to give a slurry having an average particle diameter of 0.8 micrometer.

The slurry was impregnated in the same three-dimensional structure as used in Example 1. The excess of the slurry was removed by an air blower, and the impregnated three-dimensional structure was dried at 150° C. for 3 hours, and calcined at 500° C. for 2 hours to form a catalyst.

The amounts of Al$_2$O$_3$ and V$_2$O$_5$ deposited on the finished catalyst were 40 g/liter-carrier and 9 g/liter-carrier, respectively. The amounts of deposits in the pores, however, were larger than those on the wall surface of the carrier, and the deposition was nonuniform.

COMPARATIVE EXAMPLE 2

ZrO$_2$ pellets having the same composition as obtained in Example 4-4 were pulverized and then wetpulverized by a wet mill in the same way as in Comparative Example 1 to obtain a slurry having an average particle diameter of 1.0 micrometer. A catalyst was prepared in the same way as in Example 1 using the resulting slurry. The finished catalyst contained 5 g/liter-carrier of MnO$_2$, 4 g/liter-carrier of CuO and 40 g/liter-carrier of ZrO$_2$ deposited thereon.

EXAMPLE 6

One kilogram of the same alumina pellets as used in Example 1 were immersed in 750 ml of a nitric acid solution of dinitrodiammineplatinum containing 20 g of Pt, dried at 150° C. for 3 hours, and calcined at 500° C. for 2 hours. The calcined pellets were pulverized and classified to obtain a Pt-deposited powder having a particle size distribution between 5 micrometers and 300 micrometers. The average particle diameter of the powder was 81 micrometers. The product was deposited on the same three-dimensional structure as in Example 1 to prepare a catalyst containing 50 g/liter-carrier of Al$_2$O$_3$ and 1.0 g/liter-carrier of Pt deposited thereon.

EXAMPLE 7

Two kilograms of the same alumina pellets as in Example 1 were immersed in 1.4 liters of a mixture of a nitric acid solution of dinitrodiammineplatinum containing 15 g of Pt and an aqueous solution of rhodium nitrate containing 1.67 g of Rh, dried at 150° C. for 3 hours, and calcined at 500° C. for 2 hours.

The calcined pellets were pulverized and classified in the same way as in Example 1 to give a powdery catalyst having an average particle diameter of 78 micrometers and containing Pt and Rh deposited thereon. One kilogram of the classified powdery catalyst was dispersed in an aqueous solution of 100 g (75 g as alumina) of soluble boehmite to form 2 liters of stable slurry.

The slurry had a viscosity of 72 cps at room temperature. A commercial open honeycomb monolithic body (material: cordierite; 5.66 inches in diameter, 6.0 inches in length, 300 cells/inch$^2$, wall thickness 6 mils) was used as a carrier.

The carrier was immersed in the slurry and withdrawn, and the excess of the slurry was removed by an air blower. The carrier was then dried at 150° C. for 3 hours, and calcined in air at 500° C. for 2 hours.

The finished catalyst contained 120 g/liter-carrier of Al$_2$O$_3$, 0.9 g/liter-carrier of Pt and 0.1 g/liter-carrier of Rh.

EXAMPLE 8

One kilogram of the same alumina pellets as in Example 1 were impregnated with 750 ml of an aqueous solution of 630.7 g of cerium nitrate [Ce(NO$_3$)$_3$.6H$_2$O], dried at 150° C. for 3 hours, and calcined at 500° C. for 2 hours. The calcined product was then impregnated with 750 ml of a nitric acid solution of dinitrodiammineplatinum containing 25 g of Pt, dried at 150° C. for 3 hours and calcined at 500° C. for 2 hours. The calcined product was pulverized and classified in the same way as in Example 1 to give a powdery catalyst having an average particle diameter of 79 micrometers.

The resulting powdery catalyst (150 g) was dispersed in an aqueous solution of 15 g, as SiO$_2$ of silica sol (Snowtex-O, a tradename for a product of Nissan Chemical Co., Ltd.) to give 520 ml of a stable slurry. A catalyst was prepared using the slurry and the same carrier as used in Example 1.

The finished catalyst contained 40 g/liter-carrier of Al$_2$O$_3$, 10 g/liter-carrier of CeO$_2$ and 1.0 g/liter-carrier of Pt deposited thereon.

EXAMPLE 9

Example 7 was repeated except that a commercial ceramic foam (bulk density 0.35 g/cm$^3$; porosity 87.5%, volume 1.7 liters) was used as a carrier instead of the open honeycomb monolithic body.

The resulting finished catalyst contained 120 g/liter-carrier of Al$_2$O$_3$, 0.9 g/liter-carrier of Pt and 0.1 g/liter-carrier of Rh deposited thereon.

EXAMPLE 10

Catalysts having the compositions indicated in Table 2 below were prepared by the same methods as in Examples 6 to 9. Ammonium paramolybdate was used as a source of molybdenum; ammonium dihydrogen phosphate, as a source of phosphorus; ammonium paratungstate, as a source of tungsten; niobium pentachloride, as a source of niobium; and nitrates, as sources of other catalytically active substances.

TABLE 2

| Catalyst designation | Carrier | Refractory inorganic powder (g/l-carrier) | Platinum-group element (g/l-carrier) | Base metal element (g/l-carrier) |
|---|---|---|---|---|
| 10-1 | Wall-flow monolithic body | Alumina(40) | Pt(1) | $Fe_2O_3$(8) |
| 10-2 | Wall-flow monolithic body | Alumina(40) | Pt(1) | CoO(8) |
| 10-3 | Wall-flow monolithic body | Alumina(40) | Pt(1) | NiO(8) |
| 10-4 | Wall-flow monolithic body | Alumina(40) | Pt(1) | $MoO_3$(8) |
| 10-5 | Wall-flow monolithic body | Alumina(40) | Pt(1) | $WO_3$(8) |
| 10-6 | Wall-flow monolithic body | Alumina(40) | Pt(1) | $Nb_2O_5$(8) |
| 10-7 | Wall-flow monolithic body | Alumina(40) | Pt(1) | $P_2O_5$(8) |
| 10-8 | Wall-flow monolithic body | Alumina(40) | Pt(1) | PbO(8) |
| 10-9 | Wall-flow monolithic body | Alumina(40) | Pt(1) | ZnO(8) |
| 10-10 | Wall-flow monolithic body | Alumina(40) | Pt(1) | $SnO_2$(8) |
| 10-11 | Wall-flow monolithic body | Alumina(40) | Pt(1) | CuO(8) |
| 10-12 | Wall-flow monolithic body | Alumina(40) | Pt(1) | $Mn_3O_4$(8) |
| 10-13 | Wall-flow monolithic body | Alumina(40) | Pt(1) | $CeO_2$(8) |
| 10-14 | Wall-flow monolithic body | Alumina(40) | Pt(1) | $La_2O_3$(8) |
| 10-15 | Wall-flow monolithic body | Alumina(40) | Pt(1) | AgO(8) |
| 10-16 | Wall-flow monolithic body | Alumina(40) | Pt(1) | BaO(8) |
| 10-17 | Wall-flow monolithic body | Alumina(40) | Pt(1) | MgO(8) |
| 10-18 | Wall-flow monolithic body | Alumina(40) | Pt(1) | $K_2O$(2) |
| 10-19 | Ceramic foam | $TiO_2$—$SiO_2$ (4/1,100)* | Pt(1) | $SnO_2$(8) |
| 10-20 | Ceramic foam | $TiO_2$—$ZrO_2$ (4/1,100)* | Pt(1) | $SnO_2$(8) |
| 10-21 | Ceramic foam | Zeolite | Pt(1) | $SnO_2$(8) |
| 10-22 | Wall-flow monolithic body | Alumina(40) | Pd(2)—Rh(0.2) | None |

Note:
*shows the mole ratio of oxides

COMPARATIVE EXAMPLE 3

Pt-deposited alumina pellets prepared as in Example 6 were pulverized, thereafter wet-pulverized by a wet mill to such an extent as to perform ordinary wash coating. As a result, 520 ml of a slurry with an average particle diameter of 1.1 micrometers was obtained. A catalyst was prepared by the same method as in Example 1 except that the resulting slurry was used. The resulting finished catalyst contained 50 g/liter-carrier of $Al_2O_3$ and 1.0 g/liter-carrier of Pt deposited on it.

COMPARATIVE EXAMPLE 4

Pt/Rh-deposited alumina pellets prepared as in Example 7 were pulverized, and then wet-pulverized by a wet mill to such an extent as to perform ordinary wash coating. As a result, a slurry having an average particle diameter of 1.0 micrometer was prepared. An open honeycomb monolithic supported catalyst was prepared by using the resulting slurry. The finished catalyst contained 120 g/liter-carrier of $Al_2O_3$, 0.9 g/liter-carrier of Pt and 0.1 g/liter-carrier of Rh deposited thereon.

COMPARATIVE EXAMPLE 5

An $Al_2O_3$ open honeycome monolithic catalyst was prepared in the same way as in Example 7 except that Pt and Rh were not used.

COMPARATIVE EXAMPLE 6

A catalyst was prepared in the same way as in example 8 except that 1316 g of chromium nitrate [$Cr(NO_3)_3.9H_2O$] was used instead of 630.7 g of cerium nitrate. The finished catalyst contained 40 g/liter-carrier of $Al_2O_3$, 10 g/liter-carrier of $Cr_2O_3$ and 1.0 g/liter-carrier of Pt deposited thereon.

EXAMPLE 11

Alumina powder having deposited thereon platinum was prepared as in Example 6. The powder had an average particle diameter of 81 micrometers. The resulting powdery catalyst (150 g) was dispersed in an aqueous solution containing 15 g (11.25 g as $Al_2O_3$) of boehmite to give 520 ml of a stable slurry. Ten grams of commercial alumina fibers (average diameter 9 micrometers, average length 900 micrometers) were dispersed in the slurry with stirring. The viscosity of the slurry was 25 cps at room temperature. A catalyst was prepared as in Example 1 using the resulting slurry and the same three-dimensional structure as used in Example 1.

The finished catalyst contained 50 g/liter-carrier of $Al_2O_3$, 1.0 g/liter-carrier of Pt and 3.3 g/liter-carrier of alumina fibers deposited thereon.

EXAMPLE 12

Two kilograms of the same alumina pellets as in Example 1 were immersed in 1.4 liters of a mixture of a nitric acid solution of 15 g, as Pt, of dinitrodiammineplatinum and an aqueous solution of 1.67 g, as Rh, of rhodium nitrate, dried at 150° C. for 3 hours, and calcined at 500° C. for 2 hours.

The calcined product was pulverized and classified in the same way as in Example 1 to give a powdery catalyst having an average particle diameter of 78 micrometers and containing Pt and Rh deposited thereon. One kilograms of the classified powdery catalyst was dispersed in an aqueous solution of 100 g (75 g as $Al_2O_3$ of soluble boehmite to give 2 liters of a stable slurry.

One hundred grams of commercial silicon carbide whiskers (average diameter 0.7 micrometer, average length 80 micrometers) were dispersed in the slurry with stirring.

The viscosity of the slurry was 91 cps (room temperature). The same open honeycomb monolithic carrier as used in Example 7 was immersed in the slurry, and withdrawn. The excess of the slurry was removed by an air blower. The impregnated carrier was then dried at 150° C. for 3 hours, and calcined in air at 500° C. for 2 hours to give a finished catalyst.

The finished catalyst contained 120 g/liter-carrier of $Al_2O_3$, 0.9 g/liter-carrier of Pt, 0.1 g/liter-carrier of Rh and 12 g/liter-carrier of silicon carbide whiskers deposited thereon.

EXAMPLE 13

One kilogram of commercial silica-alumina pellets (alumina content 13%, diameter 3 to 5 mm, surface area 230 m²/g) was impregnated in 750 ml of an aqueous solution of 371 g of lead nitrate [$Pb(NO_3)_2$], dried at 150° C. for 3 hours, and then calcined at 500° C. for 2 hours. The calcined product was pulverized and classified in the same way as in Example 1 to give a powdery catalyst having an average particle diameter of 82 micrometers. The classified powdery catalyst (150 g) was dispersed in an aqueous solution of 15 g, as $SiO_2$, of silica sol (Snowtex-O, a tradename for a product of Nissan Chemical Co., Ltd.), and then 10 g of commercial glass fibers (average diameter 13 micrometers, average length 200 micrometers) were put into the dispersion. With stirring, the mixture was dispersed to give 520 ml of a stable slurry. A catalyst was prepared as in Example 1 using the resulting slurry and the same three-dimensionl structure as in Example 1.

The finished catalyst contained 40 g/liter-carrier of silica-alumina, 10 g/liter-carrier of PbO, 1.0 g/liter-carrier of Pt and 3.3 g/liter-carrier of glass fibers deposited thereon.

EXAMPLE 14

A catalyst was prepared in the same way as in Example 12 except that a commercial ceramic foam (bulk density 0.35 g/cm³, porosity 87.5%, volume 1.7 liters) was used as a carrier instead of the open honeycomb monolithic carrier. The finished catalyst contained 120 g/liter-carrier of $Al_2O_3$, 0.9 g/liter-carrier of Pt, 0.1 g/liter-carrier of Rh and 12 g/liter-carrier of silicon carbide whiskers.

EXAMPLE 15

Catalysts having the compositions indicated in Table 3 were prepared by the same methods as in Examples 11 to 14.

Ammonium paramolybdate was used as a source of molybdenum; ammonium dihydrogen phosphate, as a source of phosphorus; ammonium paratungstate, as a source of tungsten; niobium pentachloride, as a source of niobium; and nitrates, as sources of other catalytically active substances.

TABLE 3

| Catalyst designation | Carrier | Refractory inorganic powder (g/l-carrier) | Inorganic fibers (g/l-carrier) | Platinum-group element (g/l-carrier) | Base metal element (g/l-carrier) |
|---|---|---|---|---|---|
| 15-1 | Wall-flow monolithic body | Alumina(40) 87 μm*[1] | Alumina fibers(3.3) 6(φ)–300(l) μm*[2] | Pt(1) | $Fe_2O_3$(10) |
| 15-2 | Wall-flow monolithic body | Alumina(40) 87 μm*[1] | $Si_3N_4$ whiskers(3.3) 0.5(φ)–40(l) μm | Pt(1) | $Fe_2O_3$(10) |
| 15-3 | Wall-flow monolithic body | Alumina(40) 87 μm*[1] | Silica fibers(3.3) 10(φ)–1000(l) μm | Pt(1) | $Fe_2O_3$(10) |
| 15-4 | Wall-flow monolithic body | Alumina(40) 87 μm*[1] | Silicon carbide whiskers(3.3) 0.6(φ)–80(l) μm | Pt(1) | CoO(10) |
| 15-5 | Wall-flow monolithic body | Alumina(40) 87 μm*[1] | Silicon carbide whiskers(3.3) 0.6(φ)–80(l) μm | Pt(1) | NiO(10) |
| 15-6 | Wall-flow monolithic body | Alumina(40) 87 μm*[1] | Silicon carbide whiskers(3.3) 0.6(φ)–80(l) μm | Pt(1) | $MoO_3$(10) |
| 15-7 | Wall-flow monolithic body | Alumina(40) 87 μm*[1] | Silicon carbide whiskers(3.3) 0.6(φ)–80(l) μm | Pt(1) | $WO_3$(10) |
| 15-8 | Wall-flow monolithic body | Alumina(40) 87 μm*[1] | Silicon carbide whiskers(3.3) 0.6(φ)–80(l) μm | Pt(1) | $Nb_2O_5$(10) |
| 15-9 | Wall-flow monolithic body | Alumina(40) 87 μm*[1] | Silicon carbide whiskers(3.3) 0.6(φ)–80(l) μm | Pt(1) | $P_2O_5$(10) |
| 15-10 | Wall-flow monolithic body | Alumina(40) 87 μm*[1] | Silicon carbide whiskers(3.3) 0.6(φ)–80(l) μm | Pt(1) | PbO(10) |
| 15-11 | Wall-flow monolithic body | Alumina(40) 87 μm[1] | Silicon carbide whiskers(3.3) 0.6(φ)–80(l) μm | Pt(1) | ZnO(10) |
| 15-12 | Wall-flow monolithic body | Alumina(40) 87 μm*[1] | Silicon carbide whiskers(3.3) 0.6(φ)–80(l) μm | Pt(1) | $SnO_2$(10) |
| 15-13 | Wall-flow monolithic body | Alumina(40) 87 μm*[1] | Silicon carbide whiskers(3.3) 0.6(φ)–80(l) μm | Pt(1) | CuO(10) |
| 15-14 | Wall-flow monolithic body | Alumina(40) 87 μm*[1] | Silicon carbide whiskers(3.3) 0.6(φ)–80(l) μm | Pt(1) | $Mn_3O_4$(10) |
| 15-15 | Wall-flow monolithic body | Alumina(40) 87 μm*[1] | Silicon carbide whiskers(3.3) 0.6(φ)–80(l) μm | Pt(1) | $CeO_2$(10) |
| 15-16 | Wall-flow monolithic body | Alumina(40) 87 μm*[1] | Silicon carbide whiskers(3.3) 0.6(φ)80(l) μm | Pt(1) | $La_2O_3$(10) |
| 15-17 | Wall-flow monolithic body | Alumina(40) 87 μm*[1] | Silicon carbide whiskers(3.3) 0.6(φ)–80(l) μm | Pt(1) | AgO(5) |
| 15-18 | Wall-flow monolithic body | Alumina(40) 87 μm*[1] | Silicon carbide whiskers(3.3) 0.6(φ)–80(l) μm | Pt(1) | BaO(5) |
| 15-19 | Wall-flow monolithic body | Alumina(40) 87 μm*[1] | Silicon carbide whiskers(3.3) 0.6(φ)–80(l) μm | Pt(1) | MgO(5) |
| 15-20 | Wall-flow monolithic body | Alumina(40) 87 μm*[1] | Silicon carbide whiskers(3.3) 0.6(φ)–80(l) μm | Pt(1) | $K_2O$(5) |
| 15-21 | Ceramic foam | $TiO_2$—$SiO_2$ (4/1,100)*[3] | Silicon carbide whiskers(10) 0.6(φ)–80(l) μm | Pt(0.9) Rh(0.1) | $CeO_2$(10) |
| 15-22 | Ceramic foam | $TiO_2$—$ZrO_2$ (4/1,100)*[3] | Silicon carbide whiskers(10) 0.6(φ)–80(l) μm | Pt(1) | $CeO_2$(10) |
| 15-23 | Ceramic foam | Zeolite(100) | Silicon carbide whiskers(10) 0.6(φ)–80(l) μm | Pt(1) | $CeO_2$(10) |

TABLE 3-continued

| Catalyst designation | Carrier | Refractory inorganic powder (g/l-carrier) | Inorganic fibers (g/l-carrier) | Platinum-group element (g/l-carrier) | Base metal element (g/l-carrier) |
|---|---|---|---|---|---|
| 15-24 | Ceramic foam | Mulite(100) | Silicon carbide whiskers(10) 0.6($\phi$)–80(l) $\mu$m | Pt(1) | $CeO_2$(10) |
| 15-25 | Wall-flow monolithic body | Alumina(40) | Silicon carbide whiskers(3.3) 0.6($\phi$)–80(l) $\mu$m | Pd(2)—Rh(0.2) | None |

*[1] Average particle diameter
*[2] diameter ($\phi$) and length (l)
*[3] Mole ratio of oxides

EXAMPLE 16

The same alumina pellets as used in Example 1 were pulverized and classified to give an alumina powder having an average particle diameter of 90 micrometers and a particle size distribution between 5 micrometers and 300 micrometers.

The classified alumina powder (150 g) was dispersed in an aqueous solution containing 15 g, as $SiO_2$, of silica sol (Snowtex-O, a tradename for a product of Nissan Chemical Co., Ltd.), and then 10 g of commercial glass fibers (average diameter 13 micrometers, average length 2200 micrometers) were put into the dispersion. The mixture was dispersed with stirring to give 520 ml of a stable slurry. The same open honeycomb monolithic carrier was immersed in the slurry, and withdrawn. The excess of the slurry was removed by an air blower. The impregnated carrier was then dried at 150° C. for 3 hours, and calcined in air at 500° C. for 2 hours to give a carrier having the alumina powder and glass fibers deposited thereon as protrusions.

The carrier was then immersed in 4 liters of an aqueous solution containing a nitric acid solution of 2.47 g, as Pt, of dinitrodiammineplatinum to deposit platinum by chemisorption, dried at 150° C. for 3 hours, and calcined at 600° C. for 2 hours.

The finished catalyst contained 50 g/liter-carrier of $Al_2O_3$, 3.3 g/liter-carrier of glass fibers and 1 g/liter-carrier of Pt deposited thereon.

COMPARATIVE EXAMPLE 7

Pt-deposited alumina pellets prepared as in Example 6 were pulverized and then wet-pulverized by a wet mill to such an extent as to perform ordinary wash coating. As a result, 520 ml of a slurry having an average particle diameter of 0.9 micrometer was obtained. Ten grams of alumina fibers were put into the slurry and dispersed with stirring. Otherwise, the same operation as in Example 11 was carried out to give a finished catalyst containing 50 g/liter-carrier of $Al_2O_3$, 1.0 g/liter-carrier of Pt and 3.3 g/liter-carrier of alumina fibers deposited thereon.

COMPARATIVE EXAMPLE 8

Example 12 was repeated except that the silicon carbide whiskers were not used. The resulting finished catalyst contained 120 g/liter-carrier of $Al_2O_3$, 0.9 g/liter-carrier of Pt and 0.1 g/liter-carrier of Rh deposited thereon.

COMPARATIVE EXAMPLE 9

Example 12 was repeated except that Pt and Rh were not used. The resulting finished catalyst contained 120 g/liter-carrier of $Al_2O_3$ and 12 g/liter-carrier of silicon carbide whiskers deposited thereon.

COMPARATIVE EXAMPLE 10

Example 13 was repeated except that 1316 g of chromium nitrate [$Cr(NO_3)_3.9H_2O$] was used instead of 371g of lead nitrate. The resulting finished catalyst contained 40 g/liter-carrier of silica-alumina, 10 g/liter-carrier of $Cr_2O_3$, 1.0 g/liter-carrier of Pt, and 3.3 g/liter-carrier of glass fibers.

EXAMPLE 17

The catalysts obtained in Examples 1 to 16 and Comparative Examples 1 to 10 were evaluated by using a 4-cylinder diesel engine with a displacement of 2300 cc. At an engine rotating speed of 2500 rpm and a torque of 4.0 kg-m, fine carbonaceous particles were captured for about 2 hours. Thereafter, the torque was increased every 5 minutes by an increment of 0.5 kg-m, and variations in the pressure drop of the catalyst layer were continuously recorded. The temperature (Te) at which the rise of the pressure due to accumulation of the fine carbonaceous particles became equal to the fall of the pressure due to combustion of the fine carbonaceous particles and the temperature (Ti) at which the fine carbonaceous particles were ignited and burnt and the pressure drop fell abruptly. The amount of the pressure drop changed per hour in the case of capturing fine carbonaceous particles at an engine rotating speed of 2500 rpm and a torque of 4.0 kg-m was calculated from the chart, and the value $\Delta$P(mmHg/hr) was determined. Furthermore, the amounts of fine carbonaceous particles at the inlet and outlet of the catalyst layer were measured, and the percent removal (ratio of capturing) of the fine carbonaceous particles was calculated. The results are shown in Tables 4 to 6.

TABLE 4

| Catalyst designation | $\Delta$P (mmHg/Hr) | Te (°C.) | Ti (°C.) | Ratio of capturing (%) |
|---|---|---|---|---|
| Example 1 | 22 | 323 | 338 | 70 |
| Example 2 | 20 | 325 | 342 | 70 |
| Example 3 | 20 | 343 | 360 | 70 |
| Example 4-1 | 21 | 340 | 362 | 70 |
| Example 4-2 | 24 | 374 | 390 | 70 |
| Example 4-3 | 22 | 352 | 366 | 70 |
| Example 4-4 | 20 | 343 | 350 | 70 |
| Example 4-5 | 24 | 345 | 360 | 70 |
| Example 4-6 | 21 | 338 | 352 | 70 |
| Example 4-7 | 23 | 372 | 388 | 70 |
| Example 4-8 | 21 | 347 | 362 | 70 |
| Example 5 | 21 | 325 | 343 | 70 |
| Comp. Ex. 1 | 27 | 365 | 380 | 70 |
| Comp. Ex. 2 | 25 | 388 | 412 | 70 |

TABLE 5

| Catalyst designation | $\Delta$P (mmHg/Hr) | Te (°C.) | Ti (°C.) | Ratio of capturing (%) |
|---|---|---|---|---|
| Example 6 | 7 | 310 | 320 | 70 |
| Example 7 | 3 | 308 | 319 | 40 |
| Example 8 | 6 | 309 | 320 | 70 |
| Example 9 | 5 | 275 | 288 | 30 |

TABLE 5-continued

| Catalyst designation | Δ P (mmHg/Hr) | Te (°C.) | Ti (°C.) | Ratio of capturing (%) |
|---|---|---|---|---|
| Example 10-1 | 7 | 308 | 318 | 70 |
| Example 10-2 | 6 | 307 | 318 | 70 |
| Example 10-3 | 6 | 307 | 318 | 70 |
| Example 10-4 | 7 | 308 | 320 | 70 |
| Example 10-5 | 6 | 305 | 316 | 70 |
| Example 10-6 | 6 | 305 | 316 | 70 |
| Example 10-7 | 5 | 300 | 314 | 70 |
| Example 10-8 | 7 | 308 | 320 | 70 |
| Example 10-9 | 7 | 310 | 320 | 70 |
| Example 10-10 | 6 | 305 | 316 | 70 |
| Example 10-11 | 7 | 310 | 317 | 70 |
| Example 10-12 | 7 | 308 | 319 | 70 |
| Example 10-13 | 5 | 305 | 315 | 70 |
| Example 10-14 | 6 | 310 | 320 | 70 |
| Example 10-15 | 6 | 308 | 318 | 70 |
| Example 10-16 | 7 | 309 | 320 | 70 |
| Example 10-17 | 7 | 308 | 319 | 70 |
| Example 10-18 | 6 | 308 | 318 | 70 |
| Example 10-19 | 5 | 272 | 285 | 30 |
| Example 10-20 | 5 | 273 | 287 | 30 |
| Example 10-21 | 6 | 275 | 288 | 30 |
| Example 10-22 | 7 | 315 | 330 | 70 |
| Comp. Ex. 3 | 7 | 395 | 403 | 70 |
| Comp. Ex. 4 | 4 | 392 | 400 | 5 |
| Comp. Ex. 5 | 18 | 565 | 575 | 5 |
| Comp. Ex. 6 | 11 | 385 | 400 | 70 |

TABLE 6

| Catalyst designation | Δ P (mmHg/Hr) | Te (°C.) | Ti (°C.) | Ratio of capturing (%) |
|---|---|---|---|---|
| Example 11 | 8 | 303 | 315 | 73 |
| Example 12 | 4 | 300 | 311 | 45 |
| Example 13 | 8 | 301 | 312 | 75 |
| Example 14 | 6 | 270 | 282 | 33 |
| Example 15-1 | 8 | 300 | 312 | 74 |
| Example 15-2 | 7 | 298 | 310 | 72 |
| Example 15-3 | 7 | 300 | 312 | 74 |
| Example 15-4 | 7 | 299 | 310 | 73 |
| Example 15-5 | 7 | 299 | 310 | 73 |
| Example 15-6 | 8 | 300 | 312 | 74 |
| Example 15-7 | 7 | 297 | 309 | 72 |
| Example 15-8 | 7 | 298 | 310 | 74 |
| Example 15-9 | 6 | 295 | 308 | 72 |
| Example 15-10 | 8 | 300 | 312 | 74 |
| Example 15-11 | 8 | 301 | 314 | 74 |
| Example 15-12 | 7 | 295 | 308 | 73 |
| Example 15-13 | 8 | 301 | 313 | 74 |
| Example 15-14 | 8 | 300 | 312 | 74 |
| Example 15-15 | 7 | 296 | 308 | 73 |
| Example 15-16 | 7 | 301 | 313 | 73 |
| Example 15-17 | 7 | 300 | 312 | 72 |
| Example 15-18 | 8 | 300 | 313 | 73 |
| Example 15-19 | 8 | 298 | 310 | 74 |
| Example 15-20 | 7 | 300 | 312 | 73 |
| Example 15-21 | 6 | 266 | 280 | 35 |
| Example 15-22 | 6 | 268 | 282 | 34 |
| Example 15-23 | 6 | 270 | 282 | 33 |
| Example 15-24 | 6 | 272 | 285 | 33 |
| Example 15-25 | 7 | 311 | 324 | 73 |
| Example 16 | 4 | 302 | 313 | 42 |
| Comp. Ex. 7 | 7 | 390 | 405 | 70 |
| Comp. Ex. 8 | 3 | 309 | 320 | 5 |
| Comp. Ex. 9 | 18 | 565 | 580 | 40 |
| Comp. Ex. 10 | 13 | 382 | 398 | 72 |

What is claimed is:

1. An exhaust gas cleaning catalyst composed of a refractory three-dimensional structure and a catalytically active substance supported thereon, wherein that surface or part of the catalyst which makes contact with an exhaust gas is formed of numerous irregularly arranged protrusions composed of a refractory inorganic powder having a particle diameter of 5 to 300 micrometers or a mixture of it with refractory inorganic fibers and the catalytically active substance supported on the protrusions.

2. The catalyst of claim 1 wherein the refractory three-dimensional structure is a ceramic foam, an open-flow ceramic honeycomb, a wall-flow honeycomb monolithic body, a metal honeycomb or a metal foam.

3. The catalyst of claim 1 wherein the refractory three-dimensional structure is a ceramic monolithic wall-flow honeycomb composed of a number of gas flow channels in which the flow channels are composed of channels having an open inlet portion and a closed outlet portion and channels having a closed inlet portion and an open outlet portion alternately and adjacently arranged and the flow channel walls adjacent to each other are composed of a porous partition wall having a gas filter function.

4. The catalyst of claim 1 wherein the refractory inorganic powder is a powder of at least one material selected from the group consisting of active alumina, silica, titania, zirconia, silica-alumina, alumina-zirconia, alumina-titania, silica-titania, silica-zirconia, titania-zirconia and zeolite.

5. The catalyst of claim 1 wherein the refractory inorganic fibers are at least one kind of fibers selected from the group consisting of fibers and whiskers of glass, alumina, silica, silicon nitride ($Si_3N_4$), silicon carbide (SiC), potassium titanate, rock wool, zirconia, titanium carbide, iron, nickel, tungsten and calcium phosphate.

6. The catalyst of claim 1 wherein the average diameter and average length of the refractory inorganic fibers are from 1/300 to 1/5, and from 1/10 to 20 times the average particle diameter of refractory inorganic powder, respectively.

7. The catalyst of claim 1 wherein the weight ratio of the refractory inorganic powder and the refractory inorganic fibers is in the range of from 1:0.05 to 1:1.

8. The catalyst of claim 1 wherein the catalytically active substance is at least one substance selected from the group consisting of platinum, rhodium, palladium, vanadium, iron, cobalt, nickel, molybdenum, tungsten, niobium, phosphorus, lead, zinc, tin, copper, chromium, manganese, cerium, lanthanum and silver.

9. The catalyst of claim 8 wherein the catalytically active substance is platinum, rhodium, or palladium.

10. The catalyst of claim 1 wherein the catalytically active substance is a mixture of at least one element selected from the group consisting of platinum, rhodium and palladium and at least one element selected from the group consisting of vanadium, iron, cobalt, nickel, molybdenum, tungsten, niobium, phosphorus, lead, zinc, tin, copper, chromium, manganese, cerium, lanthanum, silver, barium, magnesium, calcium, strontium, potassium, sodium, cesium and rubidium.

11. A process for producing an exhaust gas cleaning catalyst comprising a refractory three-dimensional structure and a catalytically active substance supported thereon, which comprises depositing the catalytically active substance on a refractory inorganic powder having a particle diameter of 5 to 300 micrometers or a mixture of it with refractory inorganic fibers, preparing an aqueous slurry from the resulting mixture and at least one dispersant selected from the group consisting of alumina sol, titania sol, zirconia sol, silica sol, soluble boehmite and soluble organic polymer compounds, forming numerous irregularly arranged protrusions on that surface or part of the refractory three-dimensional structure which makes contact with an exhaust gas by using the resulting slurry, and drying and calcining the resulting structure.

12. A process for producing an exhaust gas cleaning catalyst comprising a refractory three-dimensional structure and a catalytically active substance supported thereon, which comprises preparing an aqueous slurry from a refractory inorganic powder having a particle diameter of 5 to 300 micrometers or a mixture of it with refractory inorganic fibers and at least one dispersant selected from the group consisting of alumina sol, titania sol, zirconia sol, silica sol, soluble boehmite and soluble organic polymer compounds, forming numerous irregularly arranged protrusions on that surface or part of the refractory three-dimensional structure which makes contact with an exhaust gas by using the resulting slurry, drying the structure, optionally calcining it, depositing the catalytically active substance on the structure, and drying and calcining the resulting structure.

13. The catalyst of claim 1 wherein the protrusions are composed of a mixture of said refractory inorganic powder and said refratory inorganic fibers.

14. The process of claim 11 wherein the catalytically active substance is deposited on a mixture of said refractory inorganic powder and said refractory inorganic fibers.

15. The process of claim 12 wherein said numerous irregularly arranged protrusions are formed by a slurry prepared from a mixture of said refractory inorganic powder and said refractory inorganic fibers and at least one of said dispersants.

* * * * *